No. 787,261. Patented April 11, 1905.

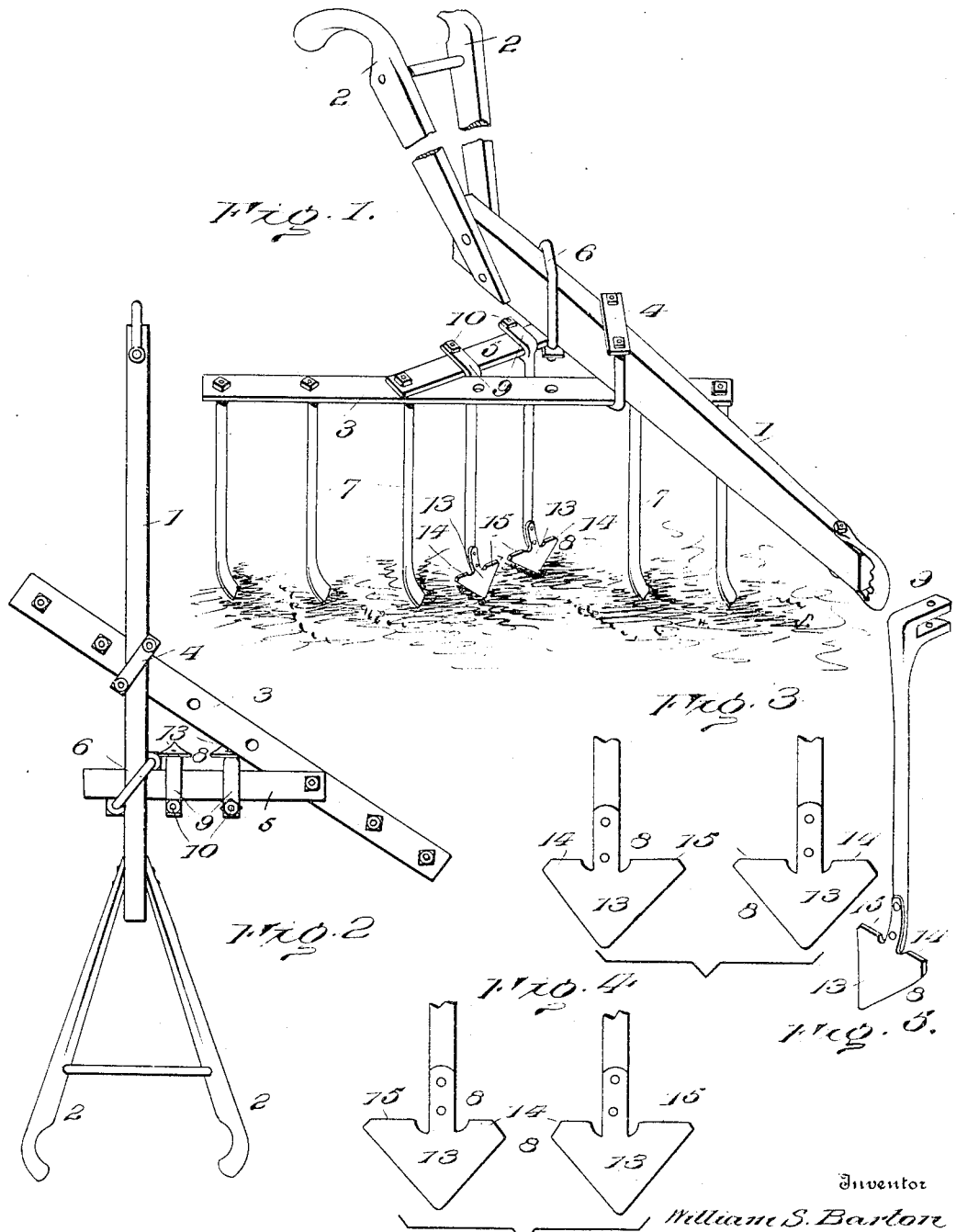

UNITED STATES PATENT OFFICE.

WILLIAM S. BARTON, OF ORANGEBURG, SOUTH CAROLINA.

STRADDLE-ROW CULTIVATOR.

SPECIFICATION forming part of Letters Patent No. 787,261, dated April 11, 1905.

Application filed October 17, 1904. Serial No. 228,704.

*To all whom it may concern:*

Be it known that I, WILLIAM S. BARTON, of Orangeburg, in the county of Orangeburg and State of South Carolina, have invented certain new and useful Improvements in Straddle-Row Cultivators; and I do hereby declare the following to be a full, clear, and exact description of the invention, such as will enable others skilled in the art to which it appertains to make and use the same.

The primary object of this invention is to provide a straddle-row cultivator having interchangeable sweeps for throwing more or less dirt, according to the height of the plants.

A further object is to so construct and arrange the parts as to permit a horse to walk at one side of the growing crops while the cultivator-sweeps will work at both sides of a single row and the ground between the rows will be cultivated.

A further object is to permit of the ready changing of the cultivator into a rake by the removal of the sweeps and the insertion of rake-teeth, and a still further object is to provide a cultivator of the character specified which will be composed of but few parts, simple and inexpensive, and not liable to readily get out of order.

The invention will be hereinafter fully set forth, and particularly pointed out in the claims.

In the accompanying drawings, Figure 1 is a view in perspective. Fig. 2 is a plan view. Figs. 3 and 4 show the two sweeps in their two positions. Fig. 5 is a detached view in perspective of one of the sweep-blades.

Referring to the drawings, 1 designates the beam, and 2 2 the handles, secured to the rear end thereof. 3 designates a tooth-carrying bar adjustably secured to the under side of beam 1 by a clip 4, said bar being set at an angle to the line of draft as well as to the beam. Its position may be readily adjusted by loosening the nuts of the clip and then tightening the same after the bar has been placed at the desired angle.

5 designates a brace connecting the tooth-carrying bar to the beam at a point in rear of clip 4, such brace being itself held to the beam by a clip 6 to permit of its adjustment to conform to the position of the tooth-carrying bar 3.

7 designates rake-teeth mounted on bar 3, one of such teeth forming the connection between such bar and the brace-bar 5. These rake-teeth are preferably removably held by nuts screwed on the threaded ends projected through openings in the bar.

8 8 designate two sweeps arranged approximately parallel and designed to work the ground on opposite sides of a row of corn or cotton or other plants. The standards of these sweeps are preferably formed with upper right-angled ends 9, equipped with spaced-apart parallel cheeks to accommodate the brace-bar, such cheeks having openings to receive nutted bolts 10. To permit these standards to be placed the desired distances apart, the nuts of bolts 10 are loosened and the standards are moved along the brace-bar to the desired extent. Each of the sweep-standards carries at its lower end a peculiarly-formed shovel or blade 13 for raising and sweeping the soil against the growing plants. Each shovel is formed with two lateral wings 14 15, the former being narrower than the latter and designed for light work, while the wider is intended for heavy work. If it is necessary to cover the roots with but little dirt, the wings 14 are caused to face the row, while if much earth is needed the wider wings 15 are placed in opposition to each other. To do this, it is only necessary to interchange the two sweep-standards. By reference to Fig. 2 it will be seen that the two sweep-standards are located to one side of the beam, and being designed to straddle the row a horse attached to the forward end of the beam will walk to the left of the row being cultivated. From this figure it will also be seen that by reason of the angularity of the tooth-carrying bar to the line of draft the two sets of rake-teeth will work the ground between adjacent rows.

The brace-bar serves not only to retain the tooth-carrying bar in its various positions, but also forms a support for the sweep-standards. The latter may be placed as far apart or as close together as conditions may require, such adjustments being necessitated by the conditions of the crops undergoing cultivation. Furthermore, the brace adds materially to the strength of the cultivator and allows the tooth-carrying bar to be adjusted to any desired extent. To effect a change of positions, it is only necessary to loosen the clips and retighten them after the tooth-carrying bar and brace-bar have been adjusted.

When the implement is not in use as a cultivator, it can be quickly changed into a rake by removing the sweep-standards and substituting additional rake-teeth 7.

The advantages of my invention are apparent to those skilled in the art.

I claim as my invention—

1. A straddle-row cultivator having standards, and blades or shovels carried by said standards having each a narrow and a wide lateral cutting-wing, said standards being removable and interchangeable to arrange toward each other the corresponding wings of adjacent blades, for the purpose stated.

2. A straddle-row cultivator comprising a beam, a tooth-carrying bar adjustably secured thereto and set at an angle to the line of draft, rake-teeth depending from said bar at or near the ends thereof, a brace secured to said bar and to said beam, and sweep-standards depending from said brace for working on opposite sides of a row, said standards having shovels or blades formed with wings for cutting to different depths.

3. The combination with the beam, the bar adjustably secured thereto, and rake-teeth secured to said bar, of a brace adjustably secured to said beam and to said bar, one of said teeth forming the connection between said brace and said bar, and blades or shovels carried by said brace.

4. The combination with the beam, the bar adjustably secured thereto having the greater portion of its length at one side of said beam and rearwardly disposed with relation thereto, and rake-teeth secured to said bar, of a brace adjustably secured to said beam and the rearwardly-extending portion of said bar, and blades or shovels carried by said brace.

5. The combination with the beam, of a bar pivotally secured to said beam having the greater portion of its length at one side of said beam, a series of rake-teeth depending from said bar at one side of said beam, a second series of rake-teeth depending from said bar at the opposite side of said beam, a space being provided intermediate said second series of rake-teeth and said beam, a brace pivotally secured to said beam and to said bar, and blades or shovels depending from said brace in line with the space intermediate said second series of rake-teeth and said beam.

In testimony whereof I have signed this specification in the presence of two subscribing witnesses.

WILLIAM S. BARTON.

Witnesses.
 FRED W. FOUNES,
 ROBT. E. COPES.